United States Patent
Renkes et al.

(10) Patent No.: US 9,068,035 B2
(45) Date of Patent: Jun. 30, 2015

(54) LIQUID COATING COMPOSITION CONTAINING A LATENT CATALYST

(75) Inventors: Tanja Renkes, Duisburg (DE); Carmen Flosbach, Wuppertal (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 122 days.

(21) Appl. No.: 13/577,271

(22) PCT Filed: Feb. 11, 2011

(86) PCT No.: PCT/US2011/024538
§ 371 (c)(1),
(2), (4) Date: Aug. 6, 2012

(87) PCT Pub. No.: WO2011/100555
PCT Pub. Date: Aug. 18, 2011

(65) Prior Publication Data
US 2012/0308730 A1    Dec. 6, 2012

Related U.S. Application Data

(60) Provisional application No. 61/303,710, filed on Feb. 12, 2010.

(51) Int. Cl.
*C08G 18/08* (2006.01)
*C08F 220/18* (2006.01)
*C09D 175/04* (2006.01)
*C08G 18/32* (2006.01)
*C08G 18/73* (2006.01)
*C08G 18/83* (2006.01)
*C09D 133/14* (2006.01)

(52) U.S. Cl.
CPC ............ *C08F 220/18* (2013.01); *C09D 175/04* (2013.01); *C08G 18/0823* (2013.01); *C08F 2220/1825* (2013.01); *C08G 18/3206* (2013.01); *C08G 18/73* (2013.01); *C08G 18/831* (2013.01); *C09D 133/14* (2013.01)

(58) Field of Classification Search
CPC ............... C09D 175/04; C09D 175/08; C08G 18/0823; C08G 18/3206; C08G 18/12; C08G 18/10
USPC .................. 524/507, 589, 590, 871, 872, 873; 427/385.5
See application file for complete search history.

(56) References Cited

U.S. PATENT DOCUMENTS

| | | | |
|---|---|---|---|
| 5,786,419 A * | 7/1998 | Meier-Westhues et al. | .. 524/590 |
| 2009/0053421 A1 * | 2/2009 | Flosbach et al. | .............. 427/386 |
| 2009/0155462 A1 | 6/2009 | Flosbach et al. | |

FOREIGN PATENT DOCUMENTS

| WO | 2007089643 A1 | 8/2007 |
|---|---|---|
| WO | 2007133407 A2 | 11/2007 |

OTHER PUBLICATIONS

ISA European Patent Office, International Search Report and Written Opinion for Application No. PCT/US2011/024538, mailed May 26, 2011.
ISA European Patent Office, International Preliminary Report on Patentability for Application No. PCT/US2011/024538, mailed Aug. 23, 2012.
European Patent Office, European Examination Report issued in Application No. 11707243.9-1304, mailed Dec. 13, 2013.
Wikipedia. Room Temperature [online]. Retrieved on Aug. 28, 2014. Retrieved from Internet: <URL:http://en.wikipedia.org/wiki/Room_temperature>.

* cited by examiner

*Primary Examiner* — Michael L Leonard
(74) *Attorney, Agent, or Firm* — Ingrassia Fisher & Lorenz, P.C.

(57) ABSTRACT

A liquid coating composition containing a crosslinkable binder A, as an optional component a crosslinker B for the binder A, and a latent catalyst C, wherein C is a carboxyl-functional resin which is present in the liquid coating composition as particles having a melting temperature of 40 to 180° C., measured by DSC at a heating rate of 10 K/min.

11 Claims, No Drawings

LIQUID COATING COMPOSITION CONTAINING A LATENT CATALYST

CROSS-REFERENCE TO RELATED APPLICATIONS

This application is a U.S. National-Stage entry under 35 U.S.C. 371 based on International Application No. PCT/US2011/024538, filed Feb. 11, 2011 which was published under PCT Article 21(2) and which claims priority to U.S. Application No. 61/303,710, filed Feb. 12, 2010, which are all hereby incorporated in their entirety by reference.

FIELD OF THE INVENTION

The invention relates to a liquid coating composition which contains a crosslinkable binder, optionally, a crosslinker (curing agent, hardener) for the binder and a latent curing catalyst.

DESCRIPTION OF THE PRIOR ART

WO 2007/089643 A1 discloses non-aqueous, liquid coating compositions which contain at least one epoxy-functional binder and at least one carboxyl-functional crosslinking resin which is present in the coating compositions as particles having a melting temperature of 40 to 180° C. The applied coating compositions are thermally cured by the ring-opening addition reaction between the epoxy groups of the epoxy-functional binder and the carboxyl groups of the carboxyl-functional crosslinking resin.

SUMMARY OF THE INVENTION

The invention is directed to a liquid coating composition which contains a crosslinkable binder A, as an optional component a crosslinker B for the binder A, and a latent catalyst C, wherein C is a carboxyl-functional resin which is present in the liquid coating composition as particles having a melting temperature of 40 to 180° C., in particular, 60 to 160° C., measured by DSC (differential scanning calorimetry) at a heating rate of 10 K/min.

DETAILED DESCRIPTION OF THE EMBODIMENTS

The coating composition according to the invention is liquid, contains organic solvent(s) and/or water and has a solids content of, for example, 35 to 75 wt. %, preferably of 40 to 65 wt. %.

The solids content of the coating composition consists of its resin solids content, the latent catalyst C and the following optional components: pigments, fillers (extenders) and further non-volatile additives. The catalyst C is not counted as part of the resin solids; rather, it is counted as a non-volatile additive.

The resin solids of the coating composition comprises the binder solids comprising at least the binder A and, optionally, crosslinker solids comprising at least the crosslinker B. If the resin solids comprise not only the binder solids but also crosslinker solids, the weight ratio between the two is, for example, 50 to 90 wt. % of binder solids: 10 to 50 wt. % of crosslinker solids, wherein the sum of the wt. % totals 100 wt. %. The binder solids may consist of the binder A. The crosslinker solids may consist of the crosslinker B. The binder A may be a self-crosslinkable binder or an externally crosslinkable binder (binder which needs an external crosslinker for crosslinking). In case of a self-crosslinkable binder A the coating composition may contain a crosslinker B, whereas in case of an externally crosslinkable binder A the coating composition contains a crosslinker B.

It is possible that the coating composition of the present invention contains epoxy-functional components like epoxy-functional polymers or resins. However, the coating composition of the present invention is typically free of epoxy-functional components like epoxy-functional polymers or resins.

Both, the binder A and the optionally contained crosslinker B are not present as solid particles in the liquid coating composition of the present invention.

Generally, the binder A is not a solid at room temperature, but, for example, a liquid material. It may be soluble in an organic solvent (mixture) and/or it is dilutable with water or a water/organic solvent mixture, for example, soluble or dispersible therein. Binders A soluble in an organic solvent (mixture) are present in dissolved form in non-aqueous coating compositions according to the invention which contain organic solvent(s). Water-dilutable binders A are present in dissolved or dispersed, for example, emulsified form in aqueous coating compositions according to the invention which optionally also contain organic solvent(s).

Generally, the crosslinker B is not a solid at room temperature, but, for example, a liquid material. It may be soluble in an organic solvent (mixture) and/or it is dilutable with water or a water/organic solvent mixture, for example, soluble or dispersible therein. Crosslinkers B soluble in an organic solvent (mixture) are present in dissolved form in non-aqueous coating compositions according to the invention which contain organic solvent(s). Water-dilutable crosslinkers B are present in dissolved or dispersed, for example, emulsified form in aqueous coating compositions according to the invention which optionally also contain organic solvent(s).

Water-dilutable binders A and water-dilutable crosslinkers B may obtain their water-dilutability by addition of external emulsifiers or they are water-dilutable because of an appropriate content of conventional hydrophilic groups. Examples of these are nonionic hydrophilic groups, such as polyethylene oxide units, and/or ionic groups or groups convertible into ionic groups. Such binders A and crosslinkers B may be converted into the aqueous phase by addition of water or by addition of neutralizing agent and water. The ionic groups or groups convertible into ionic groups comprise in particular anionic groups or groups convertible into anionic groups, such as carboxyl groups in an amount corresponding to an acid value of, for example, 10 to 50 mg of KOH per gram of binder A or of crosslinker B. Binders A and crosslinkers B containing carboxyl groups may, for example, be converted into the aqueous phase by mixing with water once their carboxyl groups have been neutralized with bases, such as ammonia, amines or aminoalcohols.

As already mentioned, the coating composition of the present invention contains a latent catalyst C (hereinafter also "catalyst C" or "resin C" for short) in the form of solid carboxy-functional resin particles. In other words, the coating composition is a coating composition that can be cured under acid catalysis. In case of a self-crosslinkable binder A the coating composition may be cured by acid-catalyzed self-condensation of appropriate functional groups of the self-crosslinkable binder A, whereas in case of an externally crosslinkable binder A it may be cured by an acid-catalyzed crosslinking reaction between the functional groups of the externally crosslinkable binder A and the functional groups of a crosslinker B reactive with the functional groups of the binder A.

The binder A may be selected from various types of binder resins including, for example, polysiloxane, polyurethane, polyester and vinyl copolymer like, for example, (meth) acrylic copolymer resins.

Examples of self-crosslinkable binders A are binders having alkoxysilane and/or silanol groups, binders having alkoxymethylamino groups and/or N-methylol groups and binders having hydroxyl groups and alkoxymethylamino groups and/or N-methylol groups.

Two particular examples of coating compositions according to the invention containing an externally crosslinkable binder A and a crosslinker B for the binder A are distinguished by containing (i) a combination of a hydroxyl-functional binder A with an aminoplast crosslinker B or (ii) a combination of a hydroxyl-functional binder A with a free polyisocyanate crosslinker B.

The hydroxyl-functional binders A comprise conventional hydroxyl-functional binders known to the person skilled in the art and are readily available commercially or may be prepared by conventional synthesis procedures. Examples are polyester resins, polyurethane resins and vinyl copolymer resins like (meth)acrylic copolymer resins, in each case with hydroxyl values of, for example, 60 to 300 mg of KOH/g and number-average molar masses of, for example, 500 to 10000.

All number-average molar mass data stated in the present description and the claims are number-average molar masses determined or to be determined by gel permeation chromatography (GPC; divinylbenzene-crosslinked polystyrene as the immobile phase, tetrahydrofuran as the liquid phase, polystyrene standards).

Aminoplast crosslinkers (resinous amine/aldehyde condensate crosslinkers) are well-known to the person skilled in the art of paint and coatings. The amine/aldehyde condensates are widely used as crosslinkers in the field of paint and coatings. Examples of amine/aldehyde condensates which may be partly or fully etherified comprise, in particular, urea/formaldehyde condensate resins, benzoguanamine/formaldehyde condensate resins and melamine/formaldehyde condensate resins. Such amine/formaldehyde condensate resins are commercially available from various manufacturers in a huge number of types regarding condensation degree and type and degree of etherification.

Free polyisocyanate crosslinkers are readily available commercially and are also well-known to the person skilled in the art of paint and coatings. Free polyisocyanates are widely used as crosslinkers in the field of two-component paint and coatings. Examples of free polyisocyanates include diisocyanates and polyisocyanates having on average more than two free isocyanate groups per molecule. Examples of diisocyanates include hexamethylene diisocyanate, tetramethylxylylene diisocyanate, isophorone diisocyanate, dicyclohexylmethane diisocyanate, cyclohexane diisocyanate, toluylene diisocyanate and diphenylmethane diisocyanate. Examples of polyisocyanates having on average more than two free isocyanate groups per molecule are those which contain heteroatoms in the residue linking the isocyanate groups. Examples of these are polyisocyanates which contain carbodiimide groups, allophanate groups, isocyanurate groups, uretidione groups, urethane groups, acylated urea groups or biuret groups, for example, polyisocyanates of the uretidione or isocyanurate type produced by di- or trimerization of the above-mentioned diisocyanates. Further examples are polyisocyanates produced by reaction of the above-mentioned diisocyanates with water and containing biuret groups or polyisocyanates produced by reaction with polyols and containing urethane groups. Particular examples are "coating polyisocyanates" based on hexamethylene diisocyanate, isophorone diisocyanate or dicyclohexylmethane diisocyanate; "coating polyisocyanates" based on these diisocyanates means the per se known biuret, urethane, uretidione and/or isocyanurate group-containing derivatives of these diisocyanates.

The latent catalyst C is contained in the coating composition in an amount that is effective in catalyzing the crosslinking mechanism of the coating composition under the conditions of cure, or to be more precise, in catalyzing (i) the self-crosslinking reaction of the self-crosslinkable binder A or (ii) the self-crosslinking reaction of the self-crosslinkable binder A and, simultaneously, the additional crosslinking reaction between the self-crosslinkable binder A and the crosslinker B or (iii) the crosslinking reaction between the externally crosslinkable binder A and the crosslinker B, in each case under the curing conditions. The latent catalyst C is contained in the coating composition in a proportion of, for example, 1 to 10 wt. %, relative to the resin solids of the coating composition; the skilled person will select the proportion of the catalyst C within said range dependent on the acid value of the resin C and the reactivity of the coating's crosslinking system.

The catalyst C does not or virtually not (only marginally) catalyze said crosslinking reactions under storage and application conditions of the coating composition of the present invention. In other words, it behaves essentially passive or even inert as long as the temperature is not raised to or above the melting temperature of resin C, what happens under the conditions of thermally curing a coating applied from the coating composition. In still other words, the carboxyl groups of the solid carboxyl-functional resin particles do not or virtually not display their catalytic activity as long as the carboxyl-functional resin C is not melted; this is the reason why the catalyst C is called latent catalyst C.

The catalyst C is present in the coating composition as solid particles, in particular, with a non-spherical shape, and has a melting temperature of 40 to 180° C., in particular 60 to 160° C. The melting temperatures are not in general sharp melting points, but instead the upper end of melting ranges with a breadth of, for example, 30 to 150° C. To avoid misunderstandings, the term "upper end of a melting range" shall mean the end temperature $T_{SE}$ as defined in German Industry Standard DIN 53765 (issue March 1994). The melting ranges and thus, the melting temperatures are determined, for example, by DSC (differential scanning calorimetry) at heating rates of 10 K/min. The acid value of the catalyst C originating from its carboxyl groups is, for example, in the range from 50 to 350 mg of KOH per gram of catalyst C.

The catalyst C is insoluble or virtually insoluble in the coating composition of the present invention and is present therein as solid particles. The catalyst C is only very slightly, if at all, soluble in organic solvents and/or in water. Its solubility can amount to, for example, less than 10, in particular less than 5 g per liter of butyl acetate or water at 20° C. The solubility can be determined by preparing a saturated solution of the catalyst C with a precipitate of the latter at 20° C., followed by filtering off and gravimetrically determining the portion of non-dissolved catalyst C.

The catalyst C may be a carboxyl-functional polyester resin or preferably a carboxyl-functional polyurethane resin.

Methods for the production of the preferred carboxyl-functional polyurethane resins C are known to the person skilled in the art. Carboxyl-functional polyurethane resins C may, for example, be produced by reacting polyisocyanates with polyols and carboxylic acids with at least one group capable of addition with isocyanate, such as, for example, aminocarboxylic acids and in particular, hydroxycarboxylic acids.

When using carboxylic acids with two or more groups capable of addition with isocyanate, such as, for example, dimethylolpropionic acid or dimethylolbutyric acid, polyurethane resins C with lateral carboxyl groups may be produced.

Polyurethane resins C with terminal carboxyl groups are particularly preferred; they may be produced by reacting polyol(s) with polyisocyanate(s) in excess and reacting the excess free isocyanate groups with one or more carboxylic acids with one group capable of addition with isocyanate, such as, for example, monoaminocarboxylic acids and in particular, monohydroxycarboxylic acids.

A further method for the production of polyurethane resins C with terminal carboxyl groups is, for example, to react polyisocyanate(s) with polyol(s) in excess and to react the excess hydroxyl groups with cyclic carboxylic anhydride.

Polyols suitable for the production of carboxyl-functional polyurethane resins C are not only polyols in the form of low molar mass compounds defined by empirical and structural formula but also oligomeric or polymeric polyols with number-average molar masses of, for example, up to 800, for example, corresponding hydroxyl-functional polyethers, polyesters or polycarbonates; low molar mass polyols defined by an empirical and structural formula are, however, preferred. The person skilled in the art selects the nature and proportion of the polyisocyanates, the polyols and the carboxylic acids with at least one group capable of addition with isocyanate or the polyisocyanates, the polyols and the cyclic carboxylic anhydrides for the production of the carboxyl-functional polyurethane resins C in such a manner that polyurethane resins C with the above-mentioned melting temperatures and the above-mentioned solubility behavior are obtained.

The carboxyl-functional polyurethane resins C may be produced in the presence of a suitable organic solvent (mixture), which, however, makes it necessary to isolate the polyurethane resins C obtained in this manner or remove the solvent therefrom. Preferably, the production of the polyurethane resins C is, however, carried out without solvent and without subsequent purification operations.

Preferred variants of carboxyl-functional polyurethane resins C and the production thereof are described in greater detail below.

In a first preferred variant, the carboxyl-functional polyurethane resins C are linear polyurethanes with terminal carboxyl groups which can be prepared by reacting 1,6-hexane diisocyanate with a diol component and with at least one carboxylic acid with one group capable of addition with isocyanate in the molar ratio x:(x−1):2, wherein x means any desired value from 2 to 6, preferably, from 2 to 4, and the diol component is one single diol, in particular, one single (cyclo)aliphatic diol with a molar mass in the range of 62 to 600, or a combination of diols, preferably two to four, in particular, two or three diols, wherein, in the case of a diol combination each of the diols preferably constitutes at least 10 mol % of the diols of the diol component. In the case of a diol combination, it is preferred, that at least 70 mol %, in particular, 100 mol % of the diols are (cyclo)aliphatic diols, each with a molar mass in the range of 62 to 600.

The term "(cyclo)aliphatic" used in the present description and the claims encompasses cycloaliphatic, linear aliphatic, branched aliphatic and cycloaliphatic with aliphatic residues. Diols differing from (cyclo)aliphatic diols accordingly comprise aromatic or aralaphatic diols with aromatically and/or aliphatically attached hydroxyl groups. One example is bisphenol A. Diols differing from (cyclo)aliphatic diols may furthermore comprise oligomeric or polymeric diols with number-average molar masses of, for example, up to 800, for example, corresponding polyether, polyester or polycarbonate diols.

1,6-hexane diisocyanate, diol component and the at least one carboxylic acid with one group capable of addition with isocyanate are reacted stoichiometrically with one another in the molar ratio x mol 1,6-hexane diisocyanate:x−1 mol diol:2 mol carboxylic acid with one group capable of addition with isocyanate, wherein x means any desired value from 2 to 6, preferably from 2 to 4.

One single diol, in particular, one single (cyclo)aliphatic diol with a molar mass in the range of 62 to 600 is used as the diol component. It is also possible to use a combination of diols, preferably two to four, in particular, two or three diols, wherein each of the diols preferably constitutes at least 10 mol % of the diols of the diol component and wherein it is further preferred, that at least 70 mol %, in particular 100 mol % of the diols are (cyclo)aliphatic diols, each with a molar mass in the range of 62 to 600.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Examples of diols which are possible as one single diol of the diol component are ethylene glycol, the isomeric propane- and butanediols, 1,5-pentanediol, 1,6-hexanediol, 1,10-decanediol, 1,12-dodecanediol, 1,4-cyclohexanedimethanol, hydrogenated bisphenol A and dimer fatty alcohol.

Examples of diols which are possible as constituent of the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and ethylene glycol, the isomeric propane- and butanediols, 1,5-pentanediol, 1,6-hexanediol, 1,10-decanediol, 1,12-dodecanediol, neopentyl glycol, butylethylpropanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 62 to 600.

Preferably, only one carboxylic acid with one group capable of addition with isocyanate is used. Examples of the at least one carboxylic acid with one group capable of addition with isocyanate are in particular monohydroxycarboxylic acids, such as, for example, glycolic acid (hydroxyacetic acid), malic acid, 12-hydroxystearic acid, 4-hydroxybenzoic acid or 1:1-adducts of monoepoxy compounds and dicarboxylic acids, for example, corresponding adducts of glycidyl ethers or glycidyl esters, such as, glycidyl versatate with dicarboxylic acids.

1,6-hexane diisocyanate, the diol(s) of the diol component and the at least one carboxylic acid with one group capable of addition with isocyanate are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. For example, 1,6-hexane diisocyanate may be reacted initially with the at least one carboxylic acid with one group capable of addition with isocyanate and then with the diol(s) of the diol component or initially with the diol(s) of the diol component and then with the at least one carboxylic acid with one group capable of addition with isocyanate. However, the diol component may, for example, also be divided into two or more portions, for example, also into the individual diols, for example, such that 1,6-hexane diisocyanate is reacted initially with part of the diol component before further reaction with the at least one carboxylic acid with one group capable of addition with isocyanate and finally with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid linear polyurethanes with terminal carboxyl groups are obtained. When low molar mass diols defined by empirical and structural formula are used for synthesis of the linear polyurethanes with terminal carboxyl groups their molar masses calculated with the example of 12-hydroxystearic acid as the only monohydroxycarboxylic acid used are in the range of 998 or above, for example, up to 2500.

The linear polyurethanes with terminal carboxyl groups assume the form of a mixture exhibiting a molar mass distribution. They do not, however, require working up and may be used directly as carboxyl-functional polyurethane resins C.

In a second preferred variant, the carboxyl-functional polyurethane resins C are linear polyurethanes with terminal carboxyl groups which can be prepared by reacting a diisocyanate component, a diol component and at least one carboxylic acid with one group capable of addition with isocyanate in the molar ratio x:(x−1):2, wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %.

The diisocyanate component, the diol component and the at least one carboxylic acid with one group capable of addition with isocyanate are reacted stoichiometrically with one another in the molar ratio x mol diisocyanate:x−1 mol diol:2 mol carboxylic acid with one group capable of addition with isocyanate, wherein x represents any value from 2 to 6, preferably from 2 to 4.

50 to 80 mol % of the diisocyanate component is formed by 1,6-hexane diisocyanate, and 20 to 50 mol % by one or two diisocyanates selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein if two diisocyanates are selected, each diisocyanate forms at least 10 mol % of the diisocyanates of the diisocyanate component. Preferably, the diisocyanate or the two diisocyanates, farming in total 20 to 50 mol % of the diisocyanate component, are selected from dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

The diol component consists to an extent of 20 to 100 mol % of at least one linear aliphatic alpha,omega-C2-C12-diol and to an extent of 0 to 80 mol % of at least one diol differing from linear aliphatic alpha,omega-C2-C12-diols. The diol component preferably consists of no more than four different diols, in particular, only of one to three diols. In the case of only one diol, it accordingly comprises a linear aliphatic alpha,omega-C2-C12-diol. In the case of a combination of two, three or four diols, the diol component consists to an extent of 20 to 100 mol %, preferably of 80 to 100 mol %, of at least one linear aliphatic alpha,omega-C2-C12-diol and to an extent of 0 to 80 mmol %, preferably of 0 to 20 mol % of at least one diol differing from linear aliphatic alpha,omega-C2-C12-diols and preferably, also from alpha,omega-diols with more than 12 carbon atoms. The at least one diol differing from linear aliphatic alpha,omega-C2-C12-diols and preferably, also from alpha,omega-diols with more than 12 carbon atoms comprises in particular (cyclo)aliphatic diols defined by empirical and structural formula and with a low molar mass in the range of 76 to 600. The proportion of possible non-(cyclo)aliphatic diols preferably amounts to no more than 30 mol % of the diols of the diol component. In the case of a diol combination, each diol preferably makes up at least 10 mol % of the diol component.

Preferably, the diol component does not comprise any non-(cyclo)aliphatic diols. Most preferably, it does not comprise any diols that are different from linear aliphatic alpha,omega-C2-C12-diols, but rather consists of one to four, preferably, one to three, and in particular, only one linear aliphatic alpha, omega-C2-C12-diol.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Examples of linear aliphatic alpha,omega-C2-C12-diols that may be used as one single diol or as constituent of the diol component are ethylene glycal, 1,3-propanediol, 1,4-butanediol, 1,5-pentanediol, 1,6-hexanediol, 1,10-decanediol and 1,12-dodecanediol.

Examples of diols that are different from linear aliphatic alpha,omega-C2-C12-diols and may be used in the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and those isomers of propanediol and butanediol that are different from the isomers of propanediol and butanediol specified in the preceding paragraph, as well as, neopentyl glycol, butyl ethyl propanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 76 to 600.

Preferably, only one carboxylic acid with one group capable of addition with isocyanate is used. Examples of the at least one carboxylic acid with one group capable of addition with isocyanate are the same as those stated above as examples in the first preferred variant of carboxyl-functional polyurethane resins C.

The diisocyanates of the diisocyanate component, the diol(s) of the diol component and the at least one carboxylic acid with one group capable of addition with isocyanate are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. For example, the diisocyanates of the diisocyanate component may be reacted initially with the at least one carboxylic acid with one group capable of addition with isocyanate and then with the diol(s) of the diol component or initially with the diol(s) of the diol component and then with the at least one carboxylic acid with one group capable of addition with isocyanate. However, the diol component may, for example, also be divided into two or more portions, for example, also into the individual diols, for example, such that the diisocyanates of the diisocyanate component are reacted initially with part of the diol component before further reaction with the at least one carboxylic add with one group capable of addition with isocyanate and finally with the remaining proportion of the diol component. In a very similar manner, however, the diisocyanate component may, for example, also be divided into two or more portions, for example, also into the individual diisocyanates, for example, such that the diol component and the at least one carboxylic acid with one group capable of addition with isocyanate are reacted initially with part of the diisocyanate component and finally with the remaining proportion of the diisocyanate component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid linear polyurethanes with terminal carboxyl groups are obtained. When low molar mass diols defined by empirical and structural formula are used for synthesis of the linear polyurethanes with terminal carboxyl groups their molar masses calculated with the example of 12-hydroxystearic acid as the only monohydroxycarboxylic acid used are in the range of 996 or above, for example, up to 2500.

The linear polyurethanes with terminal carboxyl groups assume the form of a mixture exhibiting a molar mass distribution. They do not, however, require working up and may be used directly as carboxyl-functional polyurethane resins C.

In a third preferred variant, the carboxyl-functional polyurethane resins C are polyurethanes with terminal carboxyl groups which can be prepared by reacting a trimer of a (cyclo) aliphatic diisocyanate, 1,6-hexanediisocyanate, a diol component and at least one carboxylic acid with one group capable of addition with isocyanate in the molar ratio 1:x:x:3, wherein x means any desired value from 1 to 6, preferably, from 1 to 3, wherein the diol component is one single linear aliphatic alpha,omega-C2-C12-diol or a combination of two to four, preferably, two or three, (cyclo)aliphatic diols, wherein in the case of diol combination, each of the diols makes up at least 10 mol % of the diols of the diol combination and the diol combination consists of at least 80 mol % of at least one linear aliphatic alpha,omega-C2-C12-diol.

The trimer of the (cyclo)aliphatic diisocyanate, 1,6-hexanediisocyanate, the diol component and the at least one carboxylic acid with one group capable of addition with isocyanate are reacted stoichiometrically with one another in the molar ratio 1 mol trimer of the (cyclo)aliphatic diisocyanate:x mol 1,6-hexanediisocyanate x mol diol:3 mol carboxylic acid with one group capable of addition with isocyanate, wherein x represents any value from 1 to 6, preferably from 1 to 3.

The trimer of the (cyclo)aliphatic diisocyanate is polyisocyanates of the isocyanurate type, prepared by trimerization of a (cyclo)aliphatic diisocyanate. Appropriate trimerization products derived, for example, from 1,4-cyclohexanedimethylenediisocyanate, in particular, from isophorondiisocyanate and more particularly, from 1,6-hexanediisocyanate, are suitable. The industrially obtainable isocyanurate polyisocyanates generally contain, in addition to the pure trimer, i.e., the isocyanurate made up of three diisocyanate molecules and comprising three NCO functions, isocyanate-functional secondary products with a relatively high molar mass. Products with the highest possible degree of purity are preferably used. In each case, the trimers of the (cyclo)aliphatic diisocyanates obtainable in industrial quality are regarded as pure trimer irrespective of their content of said isocyanate-functional secondary products with respect to the molar ratio of 1 mol trimer of the (cyclo)aliphatic diisocyanate:x mol 1,6-hexanediisocyanate:x:mol diol:3 mol carboxylic acid with one group capable of addition with isocyanate.

One single linear aliphatic alpha,omega C2-C12 diol or combinations of two to four, preferably of two or three, (cyclo)aliphatic diols are used as the diol component. The diol combination preferably consists of two to four, in particular, two or three, linear aliphatic alpha,omega C2-C12 diols.

Examples of one single linear aliphatic alpha,omega C2-C12 diol or linear aliphatic alpha,omega C2-C12 diols which can be used within the diol combination are ethylene glycol, 1,3-propanediol, 1,4-butanediol, 1,5-pentanediol, 1,6-hexanediol, 1,10-decanediol and 1,12-dodecanediol.

Examples of (cyclo)aliphatic diols which can be used within the diol combination in addition to the at least one linear aliphatic alpha,omega C2-C12 diol making up at least 80 mol % of the diol combination are the further isomers of propane and butane diol, different from the isomers of propane and butane diol cited in the preceding paragraph, and neopentylglycol, butylethylpropanediol, the isomeric cyclohexane diols, the isomeric cyclohexanedimethanols, hydrogenated bisphenol A and tricyclodecanedimethanol.

In the case of the diol combination, the mixture of the diols making up the combination can be used in the synthesis process or the diols making up the diol combination are each used individually in the synthesis. It is also possible to use a portion of the diols as a mixture and the remaining fraction(s) in the form of pure diol.

In the case of the diol combination, preferred diol combinations totaling 100 mol % in each case are combinations of 10 to 90 mol % 1,3-propanediol with 90 to 10 mol % 1,5-pentanediol, 10 to 90 mol % 1,3-propanediol with 90 to 10 mol % 1,6-hexanediol and 10 to 90 mol % 1,5-pentanediol with 90 to 10 mol % 1,6-hexanediol.

Preferably, only one carboxylic acid with one group capable of addition with isocyanate is used. Examples of the at least one carboxylic acid with one group capable of addition with isocyanate are the same as those stated above as examples in the first preferred variant of carboxyl-functional polyurethane resins C.

The turner of the (cyclo)aliphatic diisocyanate, 1,6-hexane-diisocyanate, the diol component and the at least one carboxylic acid with one group capable of addition with isocyanate are preferably reacted together in the absence of solvents. The reactants may here all be reacted together simultaneously or in two or more synthesis stages. Synthesis procedures in which the at least one carboxylic acid with one group capable of addition with isocyanate or the diol component and the trimer of the (cyclo)aliphatic diisocyanate alone are reacted with one another are preferably avoided. When the synthesis is performed in multiple stages, the reactants may be added in the most varied order, for example, also in succession or in alternating manner. For example, 1,6-hexane diisocyanate may be reacted initially with a mixture of diol component and carboxylic acid with one group capable of addition with isocyanate and then with the trimer of the (cyclo)aliphatic diisocyanate or a mixture of the isocyanate-functional components with the diol component and carboxylic acid with one group capable of addition with isocyanate or a mixture of the isocyanate-functional components may be reacted initially with carboxylic acid with one group capable of addition with isocyanate and then with the diol component. In the case of a diol combination, the diol component may, for example, also be divided into two or more portions, for example, also into the individual (cyclo)aliphatic diols. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvents is complete and the reaction mixture has cooled, solid polyurethanes with terminal carboxyl groups and with number average molar masses in the range of 1,500 to 4,000 are obtained. They do not require working up and may be used directly as carboxyl-functional polyurethane resins C.

In a fourth preferred variant, the carboxyl-functional polyurethane resins C are polyurethane dicarboxylic acids which can be prepared by reacting 1,6-hexane diisocyanate with a diol component in the molar ratio x:(x+1), wherein x means any desired value from 1 to 6, preferably, from 2 to 4, and the diol component is one single diol, in particular, one single (cyclo)aliphatic diol with a molar mass in the range of 62 to 600, or a combination of diols, preferably two to four, in particular two or three diols, wherein in the case of a diol combination each of the diols preferably constitutes at least 10 mol % of the diols of the diol component, and wherein the hydroxyl groups of the resultant polyurethane diols are then each reacted with one molecule of cyclic carboxylic anhydride.

In the case of a diol combination, it is preferred, that at least 70 mol %, in particular, 100 mol % of the diols are (cyclo)aliphatic diols, each with a molar mass in the range of 62 to 600.

1,6-hexane diisocyanate and the diol component are reacted stoichiometrically with one another in the molar ratio x mol 1,6-hexane diisocyanate:(x+1) mol diol, wherein x means any desired value from 1 to 6, preferably from 2 to 4.

With regard to the nature and use of the diol component and to the diols possible as constituents, in order to avoid repetition, reference is made to the statements made in relation to the first preferred variant of carboxyl-functional polyurethane resins C.

1,6-hexane diisocyanate and the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions, for example, such that 1,6-hexane diisocyanate is initially reacted with part of the diol component before further reaction with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction, which is performed without solvent, is complete, the resultant polyurethane diols are reacted with one molecule of cyclic carboxylic anhydride per hydroxyl group and the anhydride is ring-opened.

Preferably, only one cyclic carboxylic anhydride is used. Examples of usable cyclic carboxylic anhydrides are maleic anhydride, succinic anhydride, tetrahydrophthalic anhydride, hexahydrophthalic anhydride, methylhexahydrophthalic anhydride, trimellitic anhydride and pyromellitic anhydride. During the reaction, the terminal hydroxyl groups of the polyurethane diols are esterified and the terminal carboxyl groups of the polyurethane dicarboxylic acids are formed. Addition of the cyclic carboxylic anhydride and the reaction generally proceed in the temperature range from 90 to 140° C., it being possible to monitor the course of the reaction by determining the acid value. The reaction is complete when the theoretical acid value is reached. Once the reaction carried out is complete and the reaction mixture has cooled, solid polyurethane dicarboxylic acids are obtained. When low molar mass diols defined by empirical and structural formula are used for synthesis of the polyurethane dicarboxylic acids, their molar masses calculated with the example of hexahydrophthalic acid anhydride as the only cyclic carboxylic acid anhydride used are in the range of 600 or above, for example, up to 2500.

The polyurethane dicarboxylic acids assume the form of a mixture exhibiting a molar mass distribution. They do not, however, require working up and may be used directly as carboxyl-functional polyurethane resins C.

In a fifth preferred variant, the carboxyl-functional polyurethane resins C are polyurethane dicarboxylic acids which can be prepared by reacting a diisocyanate component and a diol component in the molar ratio x:(x+1), wherein x means any desired value from 1 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-did, and 0 to 80 mol % by at least one diol that is different from linear aliphatic alpha,omega-C2-C12-diols, wherein each diol of the diol component preferably forms at least 10 mol % within the diol component, and wherein the mol % of the respective diols add up to 100 mol %, and wherein the hydroxyl groups of the resultant polyurethane diols are then each reacted with one molecule of a cyclic carboxylic anhydride.

The diisocyanate component and the diol component are reacted stoichiometrically with one another in the molar ratio x mol diisocyanate:x+1 mol diol, wherein x represents any value from 1 to 6, preferably from 2 to 4.

With regard to the nature and use of the diisocyanate component, of the diol component and to the diols possible as constituents of the diol component, in order to avoid repetition, reference is made to the statements made in relation to the second preferred variant of carboxyl-functional polyurethane resins C.

The diisocyanates of the diisocyanate component and the diol(s) of the diol component are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. The diol component may, for example, be divided into two or more portions or into individual diols, for example, such that the diisocyanates are initially reacted with part of the diol component before further reaction with the remaining proportion of the diol component. Equally, however, the diisocyanate component may also be divided into two or more portions or into the individual diisocyanates, for example, such that the hydroxyl components are initially reacted with part of the diisocyanate component and finally with the remaining proportion of the diisocyanate component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction, which is performed without solvent, is complete, the resultant polyurethane diols are reacted with cyclic carboxylic anhydride in a similar manner to that already described in the fourth preferred variant of carboxyl-functional polyurethane resins C. Preferably, only one cyclic carboxylic anhydride is used. Examples of usable cyclic carboxylic anhydrides which may be mentioned are the same as those stated in the fourth preferred variant of carboxyl-functional polyurethane resins C. Once the reaction carried out is complete and the reaction mixture has cooled, solid polyurethane dicarboxylic acids are obtained. When low molar mass diols defined by empirical and structural formula are used for synthesis of the polyurethane dicarboxylic acids, their molar masses calculated with the example of hexahydrophthalic acid anhydride as the only cyclic carboxylic acid anhydride used are in the range of 598 or above, for example, up to 2500.

The polyurethane dicarboxylic acids assume the form of a mixture exhibiting a molar mass distribution. They do not, however, require working up and may be used directly as carboxyl-functional polyurethane resins C.

If, in individual cases, a proportion of the diol component used for synthesis of the polyurethane diol intermediates stated above in the context of the fourth and fifth preferred variants of polyurethane resins C is replaced by a trial component comprising at least one triol, polyurethane resins C are obtained which are branched and/or more highly carboxyl-functional compared to the respective polyurethane dicarboxylic acids. Embodiments with such polyurethane resins C are themselves further preferred variants. For example, up to 70% of the diols of the diol component in molar terms may be replaced by the triol(s) of the triol component. Examples of trials usable as constituent(s) of a corresponding trial component are trimethylolethane, trimethylolpropane and/or glycerol. Glycerol is preferably used alone as a trial component.

In the liquid coating composition of the present invention the catalyst C is present in particulate form, and preferably, in the form of particles with a non-spherical shape. In case of a non-aqueous coating composition, the catalyst C particles may be combined in any suitable manner, for example, either by stirring or mixing as a ground powder, into the liquid coating composition or into liquid constituents thereof, wherein it is possible subsequently to perform additional wet grinding or dispersing of the catalyst C particles. The subsequent grinding or dispersing may be done, for example, by means of a bead mill, in the resultant suspension. In case of an aqueous coating composition, the catalyst C particles are, in particular, present within the generally aqueously dispersed binder A phase or binder A containing phase respectively. Here it is preferred to stir or mix the catalyst C particles as a ground powder into the water-dilutable binder A not yet converted into the aqueous phase, wherein it is possible subsequently to perform additional wet grinding or dispersing of the catalyst C particles, for example, by means of a bead mill, in the resultant suspension which thereafter is converted into the aqueous phase by dilution with water.

The average particle size (mean particle diameter) of the catalyst C particles determined by means of laser diffraction is, for example, 1 to 100 μm. The catalyst C particles in the form of a ground powder may be formed by grinding (milling) of the solid resin C; for example, conventional powder coat production technology may be used for that purpose.

A further method for forming the catalyst C particles involves hot dissolution of the resin C in a dissolution medium and subsequent resin C particle formation during and/or after cooling. This method can be used in case of a non-aqueous coating composition according to the invention. Provided the non-aqueous binder A is not a self-crosslinkable binder A, dissolution of the resin C may be performed in particular in a proportion or the entirety of the non-aqueous binder A with heating to or above the melting temperature of the resin C, for example, to temperatures of 40 to above 200° C., whereupon the catalyst C particles may form during and/or after the subsequent cooling. In case the coating composition contains a crosslinker B it may also be possible to use the crosslinker B as the dissolution medium. The non-aqueous binder A or crosslinker B used as dissolution medium for the resin C may here be present liquid as such or as a solution in an organic solvent (mixture). Thorough mixing or stirring is preferably performed during cooling. Dissolution of the resin C may also be performed with heating in an organic solvent (mixture), wherein the formation of the catalyst C particles, which proceeds during and/or after the subsequent cooling, may proceed in the solvent itself. It must be ensured that the dissolution operation of resin C is performed under conditions which do not permit any chemical reaction between the resin C and the dissolution medium.

By using the method of hot dissolution and subsequent catalyst C particle formation during and/or after cooling, it is in particular possible to produce catalyst C particles with average particle sizes at the lower end of the range of average particle sizes, for example, in the range of 1 to 50 μm, in particular 1 to 30 μm.

The coating composition of the present invention contains water and/or organic solvent(s) and it has a solids content of, for example, 35 to 75 wt. %, preferably of 40 to 65 wt. %. In case of a non-aqueous coating composition the organic solvent content is, for example, 25 to 65 wt. %, preferably, 35 to 60 wt. %; the sum of the wt. % of the solids content and the organic solvent content is here, for example, 90 to 100 wt. % (any possible difference in the corresponding range of above 0 to 10 wt. % to make up to the total of 100 wt. % is in general formed by volatile additives). In case of an aqueous coating composition the organic solvent content is, for example, 0 to 20 wt %. The organic solvents are in particular conventional coating solvents, for example, glycol ethers, such as, butyl glycol, butyl diglycol, dipropylene glycol dimethyl ether, dipropylene glycol monomethyl ether, ethylene glycol dimethylether; glycol ether esters, such as, ethyl glycol acetate, butyl glycol acetate, butyl diglycol acetate, methoxypropyl acetate; esters, such as, butyl acetate, isobutyl acetate, amyl acetate; ketones, such as, methyl ethyl ketone, methyl isobutyl ketone, diisobutyl ketone, cyclohexanone, isophorone; alcohols, such as, methanol, ethanol, (iso)propanol, butanol; N-alkyl pyrrolidones, such as, N-methyl pyrrolidone; aromatic hydrocarbons, such as, xylene, Solvesso® 100 (mixture of aromatic hydrocarbons with a boiling range from 155° C. to 185° C.), Solvesso® 150 (mixture of aromatic hydrocarbons with a boiling range from 182° C. to 202° C.) and aliphatic hydrocarbons.

Apart from the catalyst C which is a non-volatile additive, the coating composition may contain further conventional coating additives, for example, emulsifiers, neutralizing agents, levelling agents, wetting agents, anticratering agents, antioxidants and/or light stabilizers. The additives are used in conventional amounts known to the person skilled in the art.

The coating composition may also contain transparent pigments, color-imparting and/or special effect-imparting pigments and/or fillers, for example, corresponding to a ratio by weight of pigment plus filler:resin solids content in the range from 0:1 to 2:1. Suitable color-imparting pigments are any conventional coating pigments of an organic or inorganic nature. Examples of inorganic or organic color-imparting pigments are titanium dioxide, iron oxide pigments, carbon black, azo pigments, phthalocyanine pigments, quinacridone pigments and pyrrolopyrrole pigments. Examples of special effect pigments are metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, and coated silicon dioxide pigments. Examples of fillers are silicon dioxide, aluminum silicate, barium sulfate, calcium carbonate and talc.

The coating compositions according to the invention containing the latent catalyst C particles are distinguished by an unimpaired storage stability (one component coating compositions) or an unimpaired pot life (multi-component coating compositions) compared to similar coating compositions which do not contain the latent catalyst C. In other words, the presence of the latent catalyst C does not negatively influence storage stability or pot life of the coating composition. Pot life is the time within which, once the mutually reactive components of a coating composition have been mixed, the coating composition may still be properly processed or applied and coatings of unimpaired quality can be achieved.

The coating composition may be used for the production of single-layer coatings or for the production of one or more coating layers within a multilayer coating, such as, in particular, an automotive multilayer coating, either on an automotive body or on an automotive body part. This may relate to both original and repair coating applications.

Thus, the present invention also relates to a process for the production of a coating layer on a substrate, comprising the steps:

1) applying a coating layer from the coating composition of the present invention on a substrate, and
2) thermally curing the coating layer at an object temperature at or above the melting temperature of the catalyst C.

The coating composition may be applied by means of conventional application methods, in particular, by spraying onto any desired uncoated or precoated substrates, for example, of metal or plastics.

In step 2) of the process of the present invention the coating layer applied in step 1) is thermally cured (i) by the acid catalyzed self-crosslinking reaction of the self-crosslinkable binder A or (ii) by the acid catalyzed self-crosslinking reaction of the self-crosslinkable binder A and, simultaneously, the also acid-catalyzed additional crosslinking reaction between the self-crosslinkable binder A and the crosslinker B or (iii) the acid catalyzed crosslinking reaction between the externally crosslinkable binder A and the crosslinker B. Thermal curing proceeds at object temperatures at or above the melting temperature of the catalyst C contained in the corresponding coating composition, for example, at >40 to 200° C., preferably, >60 to 180° C., for example, by baking. Under said thermal curing conditions the catalyst C displays its catalytic activity in terms of accelerating the crosslinking reaction compared to working with the uncatalyzed coating composition. By using catalyst C in the coating composition it is also possible to reduce the required object temperature during bake curing, provided that the object temperature lies at or above the melting temperature of catalyst C.

EXAMPLES

Examples 1a to 1c

Preparation of Polyurethane Dicarboxylic Acids

Polyurethane dicarboxylic acids were produced by reacting HDI (1,6-hexane diisocyanate) with one or more diols and the resultant polyurethane diols were then in a second step reacted with the stoichiometric amount of succinic anhydride (one mol of succinic anhydride per mol OH) in accordance with the following general synthesis method:

One diol or a mixture of diols was initially introduced into a 2 liter four-necked flask equipped with a stirrer, thermometer and column and 0.01 wt. % dibutyltin dilaurate, relative to the initially introduced quantity of diol(s), were added. The mixture was heated to 80° C. HDI was then apportioned and a temperature was maintained so that the hot reaction mixture did not solidify. The reaction mixture was stirred until no free isocyanate could be detected (NCO content<0.1%). Thereafter the stoichiometric amount of succinic anhydride was apportioned and a temperature was maintained so that the hot reaction mixture did not solidify. The reaction was performed until the theoretical acid value was reached. The hot melt was then discharged and allowed to cool and solidify.

The melting behavior of the resultant polyurethane dicarboxylic acids was investigated by means of DSC (differential scanning calorimetry, heating rate 10 K/min).

Examples 1a to 1c are shown in Table 1. The Table states which reactants were reacted together in what molar ratios and the final temperature of the melting process measured by DSC is stated in ° C.

TABLE 1

| Ex. | Mols HDI | Mols diol A | Mols diol B | Mols diol C | Mols SA | FT |
|---|---|---|---|---|---|---|
| 1a | 2 | 2 PROP | 1 HEX | | 2 | 117° C. |
| 1b | 2 | 3 PENT | | | 2 | 135° C. |
| 1c | 3 | 1.33 PENT | 1.33 PROP | 1.33 HEX | 2 | 108° C. |

FT; final temperature of the melting process
HEX: 1,6-hexanediol
PENT: 1,5-pentanediol
PROP: 1,3-propanediol
SA: succinic anhydride Examples 2a and 2b Preparation of Carboxyl-unctional Polyurethanes Carboxyl-functional polyurethanes were produced by reacting HDI with a mixture of GLY (glycerol) and one or more diols and the resultant polyurethane polyols were then in a second step reacted with the stoichiometric amount of succinic anhydride (one mol of succinic anhydride per mol OH) in accordance with the following general synthesis method:

The polyols were initially introduced into a 2 liter four-necked flask equipped with a stirrer, thermometer and column and 0.01 wt. % dibutyltin dilaurate, relative to the initially introduced quantity of polyols, were added. The mixture was heated to 80° C. HDI was then apportioned and a temperature was maintained so that the hot reaction mixture did not solidify. The reaction mixture was stirred until no free isocyanate could be detected (NCO content<0.1%). Thereafter the stoichiometric amount of succinic anhydride was apportioned and a temperature was maintained so that the hot reaction mixture did not solidify. The reaction was performed until the theoretical acid value was reached. The hot melt was then discharged and allowed to cool and solidify.

The melting behavior of the resultant carboxyl-functional polyurethanes was investigated by means of DSC (differential scanning calorimetry, heating rate 10 K/min).

Examples 2a and 2b are shown in Table 2. The Table states which reactants were reacted together in what molar ratios and the final temperature of the melting process measured by DSC is stated in ° C.

TABLE 2

| Ex. | Mols HDI | Mols GLY | Mols Diol A | Mols Diol B | Mols Diol C | Mols SA | FT |
|---|---|---|---|---|---|---|---|
| 2a | 2 | 1 | 2 HEX | | | 3 | 90° C. |
| 2b | 2 | 1 | 1 HEX | 1 PENT | | 3 | 92° C. | cf. Table 1 for abréviations.

Example 3

Preparation of a Clear Coat Composition

The following components were mixed:
57.6 pbw (parts by weight) of a solution of a hydroxyl-functional methacrylic binder resin in a 34 pbw:4 pbw mixture of Solvesso® 100 and n-butanol (solids content 62 wt. %; copolymer of 1 pbw of acrylic acid, 6.1 pbw of butyl acrylate, 5 pbw of hydroxypropyl methacrylate, 5 pbw of isobutyl methacrylate, 7.5 pbw of hydroxyethyl acrylate, 10 pbw of styrene, 10 pbw of t-butyl methacrylate, 16.6 pbw of butyl methacrylate),
14.4 pbw Cymel® 327/90 (melamine crosslinker),
5.0 pbw butyl diglycol acetate,
5.0 pbw butyl diglycol,
8.0 pbw butyl glycol,
10.0 pbw ethoxypropyl acetate.

Example 4

Preparation of a Clear Coat Composition Containing a Latent Catalyst

The solid carboxyl-functional polyurethane of Example 1c was comminuted, ground and sieved by means of grinding and sieving methods conventional for the production of powder coatings and, in this manner, converted into a powder with an average particle size of 50 μm (determined by means of laser diffraction).

4 pbw of the pulverized polyurethane 1c were mixed into 100 pbw of the clear coat composition of Example 3.

The storage stability of the clear coat compositions of Examples 3 and 4 was tested by storing at 40° C. for 21 days. The clear coat compositions of Examples 3 and 4 were also applied onto glass plates by means of a doctor blade (doctor blade 9), flashed off for 10 minutes and then baked for 20 minutes at 140° C.

Table 3 shows technological properties of the clear coat compositions.

TABLE 3

| clear coat | storage stability | coating appearance after baking |
|---|---|---|
| 3 | no viscosity increase | clear tacky film |
| 4 | no viscosity increase | clear tack-free film |

Example 4 was repeated using carboxyl-functional polyurethanes 1a, 1b, 2a and 2b in varying amounts instead of carboxyl-functional polyurethane 1c. The storage stability of the resultant clear coat compositions was tested by storing at 40° C. for 21 days. No viscosity increase could be determined.

What is claimed is:
1. A liquid coating composition containing a crosslinkable binder A, as an optional component a crosslinker B for the binder A, and a latent catalyst C, wherein C is a carboxyl-functional resin which is present in the liquid coating composition as particles having a melting temperature of 40 to 180° C., measured by DSC at a heating rate of 10 K/min, wherein the crosslinkable binder A is a hydroxyl-functional binder that has a hydroxyl value of from about 60 to about 300 mg of KOH/g, and wherein the crosslinkable binder A is a liquid at room temperature, wherein the liquid coating composition is free of an epoxy-functional component.

2. The coating composition of claim 1 containing organic solvent(s) and/or water and having a solids content of 35 to 75 wt. %, wherein the solids content consists of the resin solids content, the latent catalyst C and optional components: pigments, fillers and further non-volatile additives.

3. The coating composition of claim 1, wherein the binder A is a self-crosslinkable binder.

4. The coating composition of claim 1, wherein the crosslinker B is selected from the group consisting of aminoplast crosslinkers and free polyisocyanate crosslinkers.

5. The coating composition of claim 1, wherein the catalyst C is contained in a proportion of 1 to 10 wt. %, relative to the resin solids of the coating composition.

6. The coating composition of claim 1, wherein the catalyst C has an acid value originating from its carboxyl groups of 50 to 350 mg of KOH/g.

7. The coating composition of claim 1, wherein the catalyst C is a polyester resin or a polyurethane resin.

8. The coating composition of claim 1, wherein the melting temperature of the catalyst C is from about 60 to about 160° C.

9. The coating composition of claim 1, wherein the solubility of the catalyst C is less than 10 g per liter of butyl acetate or water at 20° C.

10. The coating composition of claim 1, wherein the average particle size of the catalyst C particles determined by means of laser diffraction is 1 to 100 μm.

11. A process for the production of a coating layer on a substrate, comprising the steps:
  1) applying a coating layer of a liquid coating composition on a substrate, wherein the liquid coating composition contains a crosslinkable binder A, as an optional component a crosslinker B for the binder A, and a latent catalyst C, wherein C is a carboxyl-functional resin which is present in the liquid coating composition as particles having a melting temperature of 40 to 180° C., measured by DSC at a heating rate of 10 K/min, wherein the crosslinkable binder A is a hydroxyl-functional binder that has a hydroxyl value of from about 60 to about 300 mg of KOH/g, and wherein the crosslinkable binder A is a liquid at room temperature, wherein the liquid coating composition is free of an epoxy-functional component, and
  2) thermally curing the coating layer at an object temperature at or above the melting temperature of the catalyst C.

\* \* \* \* \*